Aug. 11, 1925.
C. A. SWANSON
1,549,163
SPOTLIGHT
Filed June 21, 1923
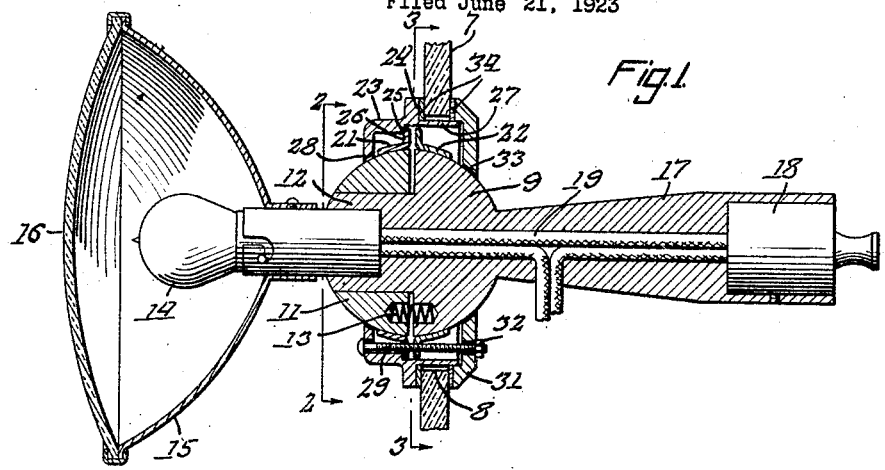
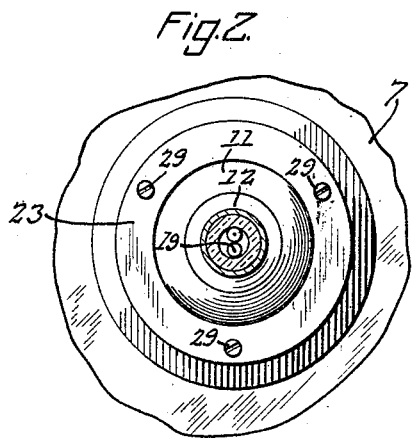
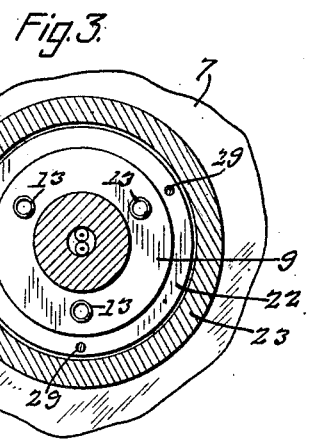
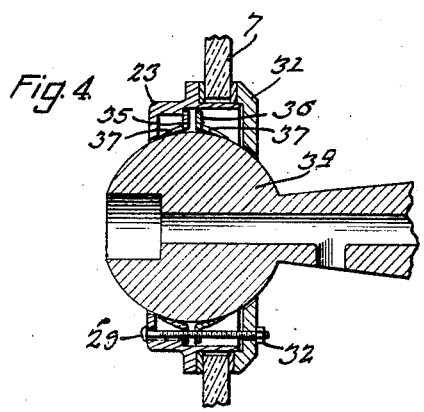
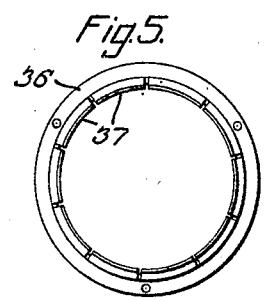
WITNESS-
Lou E. Coudé.
INVENTOR.
Carl A. Swanson.
By Wilson & McCanna.
ATTYS.

Patented Aug. 11, 1925.

1,549,163

UNITED STATES PATENT OFFICE.

CARL A. SWANSON, OF ROCKFORD, ILLINOIS, ASSIGNOR TO ROCKFORD AUTO PRODUCTS COMPANY, OF ROCKFORD, ILLINOIS, A CORPORATION OF ILLINOIS.

SPOTLIGHT.

Application filed June 21, 1923. Serial No. 646,757.

*To all whom it may concern:*

Be it known that I, CARL A. SWANSON, a citizen of the United States, residing at Rockford, in the county of Winnebago and State of Illinois, have invented certain new and useful Improvements in Spotlights, of which the following is a specification.

This invention relates to spot lights of the kind adapted to be mounted on a windshield or upon the body of a motor vehicle, or any other support, and characterized by a dirigible mounting, carrying the spot light on the outer side of the support and a handle at the inner side thereof, whereby an occupant of the vehicle may change the direction of the rays at will.

The primary object of the present invention is to provide an improved mounting for a spot light of the character described with the view to facilitating installation of the spot light, protecting the bearing in the mounting thereof, permitting adjustment for wear, and to insuring maintenance of the parts in proper operative relation under varying weather conditions and changes in temperature.

I have also aimed to provide a spot light embodying the features described, constructed in such simple and novel manner as to enable production thereof at a comparatively low cost.

In furtherance of the foregoing, I have provided, generally stated, a spot light mounting including frictionally engaged parts adapted to be installed on a windshield or other supporting part in completely assembled and operative relation. This unit of assembly in the preferred form includes a spherical spot light supporting means to which the handle is attached, a bearing ring or casing which frictionally engages and directly supports said spherical means and in which the latter is adapted to be turned or angularly adjusted, and an annular member carrying said bearing ring or casing and adapted to be seated on one side of a windshield or similar support and to be secured in this position by a holding or retaining member on the opposite side thereof.

Other objects and attendant advantages will be appreciated by those skilled in this art as the invention becomes better understood by reference to the following description when considered in connection with the accompanying drawing, in which—

Figure 1 is a vertical sectional view through a spot light embodying my invention;

Figs. 2 and 3 are cross-sectional views taken substantially on the lines 2—2 and 3—3, respectively, of Fig. 1;

Fig. 4 is a vertical fragmentary sectional view through a spot light mounting embodying a modified form of my invention; and Fig. 5 is an end view of one of the friction bearing rings employed in the latter form.

My improved spot light or headlight may be mounted on any supporting means or part, but is particularly adapted for use in connection with motor vehicles, and especially for mounting on the windshield or upper body structure thereof. In the present example, I have illustrated the spot light as mounted on the glass windshield 7. This windshield has an annular orifice 8 through which the spot light structure extends.

My invention contemplates the mounting in such an orifice upon the supporting part, such as the windshield at one side thereof, an improved completely assembled spot light unit, and the provision of means adapted to be applied from the opposite side of the windshield for securing the spot light assembly in position. It is essential that the spot light included in this unit shall be mounted with capacity for angular, and preferably universal, adjustment, as by means of a ball and socket mounting. It is also preferred that the mounting shall include frictionally engaged bearing parts, the tension of which may be varied at will, and sion of which may be varied at will, and which when properly set, will remain in an operative condition regardless of changes in temperature and other varying conditions.

In the present case, I have shown a preferred and a modified form of the invention, the former including a sectional spherical member which supports the spot light proper and the latter a one-piece spherical member.

In the preferred form shown in Fig. 1, the spherical member is composed of parts 9 and 11, the latter of which is slidable on a cylindrical bearing extension 12 integral with the former. A plurality of compression springs 13 interposed between the sections or parts 9 and 11 of the spherical or ball member, function to separate the parts thereof for holding them in frictional contact with a bearing casing which will be presently described.

The spherical member carries on one side an electric spotlight, including a bulb 14 and its socket, a reflector 15, and a lens 16, and on the other or opposite side a handle 17. This handle may in turn carry a switch 18, which is connected by wiring 19 reaching through the handle and ball member 9, to the electric bulb socket.

The bearing ring or casing above referred to, carries the spherical member in operative relation to a fixed member or supporting casing which will be presently described, and provides a bearing in which said member is adapted to be turned. This bearing casing may comprise one or more ring-like parts, and at present two such parts 21 and 22 are shown, each having an internal spherical bearing surface complemental to that of the lamp-supporting member. These parts may be suitably formed, as from sheet metal, as shown. In the event that only one such bearing ring is used, it will function to hold the spherical member seated directly against one of the fixed casing members presently to be described.

The bearing casing in turn is supported by a fixed casing member designated generally by 23. This member in the present embodiment is shaped to provide an outer annular shoulder 24 adapted to seat against one side of the windshield 7, an inner annular shoulder 25 adapted to receive the outwardly turned flange 26 of the bearing part 21, a sleeve 27 reaching through the orifice 8, and an opening 28 of less diameter than said spherical member. The bearing casing is held in operative relation to the casing member 23 by a plurality of screws 29 passing loosely through the part 21 and threaded in the part 22. The part 21 may obviously be omitted, as mentioned above, in which event the part 22 would hold the spherical member against the casing member 23. The outer casing is completed by a member in the form of a disk 31 on the side of the windshield 7 opposite from the member 23, which fits on the sleeve 27 and is adapted to be drawn against said windshield 7. The screws 29 pass loosely through the outer casing member 31 and have nuts 32 on their outer ends adapted to be turned down for drawing the casing members 23 and 31 together. The member 31 has an opening 33 for passage of the spherical member, this opening being sufficiently large as to allow clearance between said members.

A gasket 34 of paper or any suitable material, is interposed between each of the casing members 23 and 31 and the supporting windshield 7; and in the event that the windshield 7 varies in thickness as it does in the case of the windshield glass on different makes of motor cars, a number of such gaskets may be added when necessary. I prefer to seal the mounting between said casing members and the windshield 7 by applying shellac or the equivalent to the gaskets, thereby obtaining a water-tight joint between these parts.

From the foregoing, it will be observed that a unit of assembly is provided comprising the casing member 23, the bearing casing parts 21 and 22 carried thereby, and the spherical lamp-supporting member carried by the bearing casing. These parts may obviously be completely assembled and properly adjusted as to frictional contact of the bearing casing parts on the spherical member before mounting the unit on the windshield or other support. It will be manifest that by turning the screw 29, the bearing part 22 may be draw with greater or less pressure into contact with the spherical member, thereby placing the compression spring 13 under greater or less tension. The separable parts of the spherical member are thus securely held together in operative relation and against displacement so that they may be conveniently handled when mounting the spot light. The bearing surfaces are at the same time inclosed by the outer casing member 23 and thereby protected against the admission of foreign matter. This protective casing is particularly desirable in connection with mounting the spot light on a windshield in which the opening 8 has been recently cut, as it prevents small particles of glass from dropping onto the bearing surfaces.

After the unit above described has been properly positioned on the windshield 7, the outer casing part 31 may be placed in position on the screws 29 and the nuts 32 applied for clamping the casing parts together. In this connection, it will be observed that the screws 29 should be held against turning when drawing the nuts 32 tight, in order to prevent interference with the previous adjustment of the bearing part 22.

It will be further observed that the parts which provide bearing surfaces for the spherical member are independent of the outer casing which when mounted is rigid with respect to the windshield 7. This construction is particularly desirable, because it permits of relative adjustment of the frictionally engaged parts for increasing or diminishing the friction, or for taking up wear, without disturbing the mounting on the support. This construction also allows for expansion and contraction of the cooperating parts without binding the frictionally engaged parts or causing them to loosen and allow the spot light to shift from a set position. Such construction also permits the parts above referred to as comprising a unit of assembly, to be completely assembled in operative relation and packed in this condition for shipping. This unit is therefore, ready at any time to be mounted on a windshield or any other support. A still further advantage is that after the spot light has been in use, the screws 29 may be turned for increasing the friction in the mounting of the lamp-carrying member without disturbing the mounting on the windshield 7. It will be seen, therefore, that my invention contemplates the provision of means whereby such frictional contact may be varied without disassembling or removing any parts and without disturbing the mounting on the principal supporting part.

In Figs. 4 and 5, I have shown a modified form of the invention in which the spherical portion of the lamp-carrying member 34 is in one part. The bearing casing is accordingly made up of two ring-like members 35 and 36, each of which has slotted resilient portions 37 frictionally engaging the periphery of the spherical part 34.

The bearing casing parts 35 and 36 are carried in the same manner as the parts 21 and 22 above described. That is, the same outer casing comprising members 23 and 31 is used, together with screws 29, which pass loosely through the parts 35 and 31 and are threaded in the part 36 and equipped with nuts 32.

It will be evident that this modification embodies the same principles of construction and operation as described above with reference to the preferred form, except that the spherical member is in one part and the resilient means for maintaining frictional contact in the mounting of the spherical member is established by one or more pressure rings. It should be understood, therefore, that various means may be employed within the purview of the present invention for establishing the desired frictional contact and for varying the friction when occasion requires.

It is believed that the foregoing conveys a clear understanding of the objects prefaced above, and it should be understood that various changes might be made in the construction and arrangement of parts and that various mechanical expedients might be employed in obtaining the results disclosed herein without departing from the spirit and scope of the invention as expressed in the appended claim:

I claim:

A device of the character described comprising in combination with a support having an opening therethrough, of an annular casing member having an outer and an inner annular shoulder, the former of which is adapted to be seated on said support around said opening, said member having a sleeve interposed between said shoulders and reaching through said opening, a bearing casing seated on said inner shoulder, lamp-carrying means mounted in said bearing casing, and an outer casing member associated with said sleeve for holding the first mentioned casing member in position on the support.

CARL A. SWANSON.